US008091284B2

(12) United States Patent
Iennarella et al.

(10) Patent No.: US 8,091,284 B2
(45) Date of Patent: Jan. 10, 2012

(54) GLASS SUPPORTING ASSEMBLY FOR A MOTOR VEHICLE DOOR WITH AN UNFRAMED UPPER EDGE

(75) Inventors: Vincenzo Iennarella, Turin (IT); Alessandro Macor, Turin (IT)

(73) Assignee: Fiat Group Automobiles S.p.A. (IT)

( * ) Notice: Subject to any disclaimer, the term of this patent is extended or adjusted under 35 U.S.C. 154(b) by 374 days.

(21) Appl. No.: 12/388,985

(22) Filed: Feb. 19, 2009

(65) Prior Publication Data

US 2009/0211159 A1 Aug. 27, 2009

(30) Foreign Application Priority Data

Feb. 21, 2008 (EP) .................................... 08425105

(51) Int. Cl.
*B60J 1/12* (2006.01)
*E05F 11/38* (2006.01)

(52) U.S. Cl. ........................................... 49/348; 49/502

(58) Field of Classification Search .................... 49/348, 49/349, 352, 502
See application file for complete search history.

(56) References Cited

U.S. PATENT DOCUMENTS

| | | | | |
|---|---|---|---|---|
| 4,785,582 A * | 11/1988 | Tokue et al. | 49/211 |
| 4,956,942 A * | 9/1990 | Lisak et al. | 49/502 |
| 5,622,005 A * | 4/1997 | Ochenski et al. | 49/375 |
| 6,283,534 B1 * | 9/2001 | Mrozowski et al. | 296/146.2 |
| 6,426,208 B1 * | 7/2002 | Kakkis et al. | 435/201 |
| 6,453,617 B1 * | 9/2002 | Klippert et al. | 49/375 |
| 6,598,345 B1 * | 7/2003 | Arimoto et al. | 49/374 |
| 2006/0174542 A1 * | 8/2006 | Bernard et al. | 49/352 |
| 2006/0254146 A1 * | 11/2006 | Florentin et al. | 49/349 |
| 2007/0214726 A1 * | 9/2007 | Graf et al. | 49/352 |
| 2009/0288345 A1 * | 11/2009 | Cappelli et al. | 49/324 |

FOREIGN PATENT DOCUMENTS

| | | | |
|---|---|---|---|
| EP | 1 520 742 | | 4/2005 |
| EP | 1520742 | * | 6/2005 |
| FR | 2 897 597 | | 8/2007 |

OTHER PUBLICATIONS

European Search Report from corresponding EP Application No. 08 42 5105.7.

* cited by examiner

*Primary Examiner* — Katherine Mitchell
*Assistant Examiner* — Justin Rephann
(74) *Attorney, Agent, or Firm* — Alston & Bird LLP

(57) ABSTRACT

A glass supporting assembly for a motor vehicle door with an unframed upper edge is provided with a fixed structure and a frame, which has at least one guide to support and guide a glass and is connectable to the door in such a way as to make it tiltable about a substantially horizontal axis of adjustment; a slot is obtained in a tangential direction in relation to the axis of adjustment in one of either the fixed structure or the frame, and is slidingly engaged by a pin with an axis orthogonal to the tangential direction; the pin is carried by the other of either the fixed structure or the frame, carries a screwed locking nut, and is axially rotatable; the rotational motion of the pin is converted into translational motion by a positioning device to position the pin along the slot.

10 Claims, 4 Drawing Sheets

GLASS SUPPORTING ASSEMBLY FOR A MOTOR VEHICLE DOOR WITH AN UNFRAMED UPPER EDGE

The present invention is related to a glass supporting assembly for a motor vehicle door with an unframed upper edge, i.e. for a door without any upper structural element which delimits the window engaged by the glass.

CROSS-REFERENCE TO RELATED APPLICATIONS

This application claims priority from European Patent Application No. EP08425105.7, filed Feb. 21, 2008, the contents of which are incorporated herein by reference.

BACKGROUND OF THE INVENTION

As is known, in side doors with an unframed upper edge, when the side door is closed and its glass is fully raised, the upper edge of the glass rests against a sealing element which is held in a fixed position by an upper side member forming part of the bodywork or the roof.

During the assembly of the door on the motor vehicle, the position of the upper edge of the glass with respect to the sealing element must be adjusted in such a way as to press the sealing element when the glass is raised with a deformation and/or pressure such as to ensure a water-tight seal, but not such as to make closing the side door difficult.

For this purpose, varying the position of a frame that supports the glass and that is arranged inside the door is known in the prior art. This frame has a hinged upper portion to allow the frame and, therefore, the glass, to tilt about an axis of adjustment that is substantially horizontal and parallel to the glass.

To stop the tilting, a lower portion of the frame carries a screw on which a nut is screwed. When the frame is made to tilt and the upper edge of the glass moves towards and away from the roof, the screw slides in a slot which is obtained in a fixed portion and is elongated in a tangential direction with respect to the axis of adjustment. Once a satisfactory adjustment has been achieved, the position chosen for the glass is held by tightening the nut on the screw against the fixed portion.

The adjustment procedure described above falls far short of being satisfactory as it does not enable the positioning of the upper edge of the glass in a precise and quick manner. The slot defines a maximum sliding stroke of about 10-12 millimeters, making it quite difficult for the screw to slide along the slot in a precise manner to find the correct angular position for the glass. Furthermore, once it has reached a satisfactory position, it is quite difficult to tighten the nut while at the same time keeping the screw firm in the slot.

SUMMARY OF THE INVENTION

The purpose of the present invention is to produce a glass supporting assembly for a motor vehicle door with an unframed upper edge which overcomes the drawbacks described above in a simple and cost-effective manner.

According to the present invention a glass supporting assembly for a motor vehicle door with an unframed upper edge is provided; the assembly comprising:

a fixed structure;

a frame comprising:

at least one guide to support a glass and make the glass slide between a raised position and a lowered position, and an upper portion connectable to said door in such a way as to make said frame tiltable in relation to said fixed structure about a substantially horizontal axis of adjustment;

a slot obtained in one of either said fixed structure or said frame, and elongated in a tangential direction with respect to said axis of adjustment;

a pin carried by the other of either said fixed structure or said frame, with an axis orthogonal to said tangential direction and slidable in said slot; and locking means to lock said frame in relation to said fixed structure;

characterized by the fact that said pin is rotatable about its own axis in relation to said fixed structure and said frame, and by the fact that it comprises a positioning device that converts the motion from rotational to translational to position said pin along said slot in response to a rotation of said pin about its axis.

BRIEF DESCRIPTION OF THE DRAWINGS

In order to better understand the present invention, a non-limiting preferred embodiment thereof will now be described by way of example with reference to the accompanying drawings, in which.

DETAILED DESCRIPTION OF THE INVENTION

Figure 1:
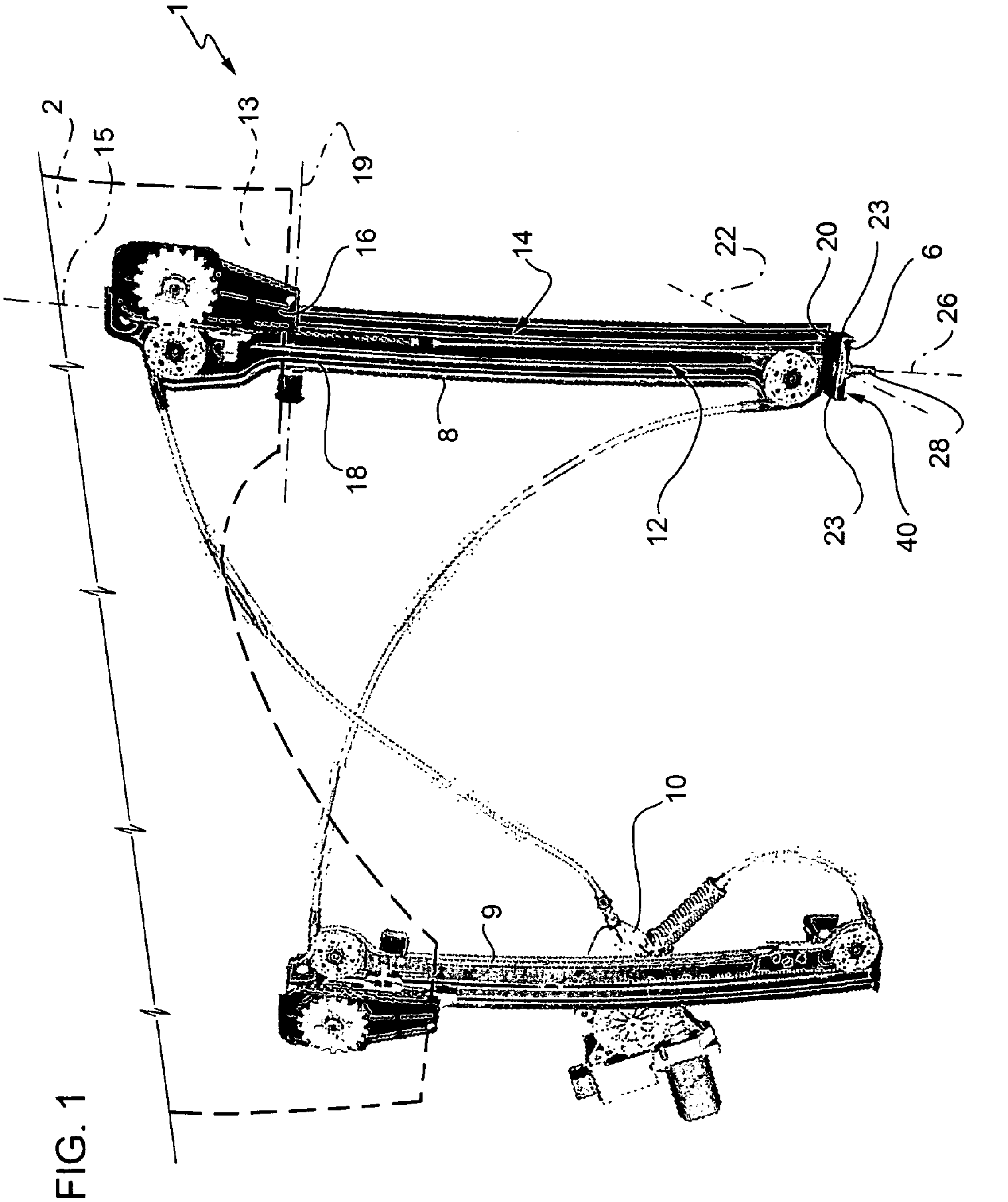
FIG. 1 is a perspective view of a preferred embodiment of the glass supporting assembly for a motor vehicle door with an unframed upper edge, according to the present invention.

In FIG. 1, the number 1 indicates an assembly to support a glass 2 (partially shown) for a motor vehicle door with an unframed upper edge (not shown), i.e. for a door without any upper structural element which delimits the window engaged by the glass 2.

Figure 4:
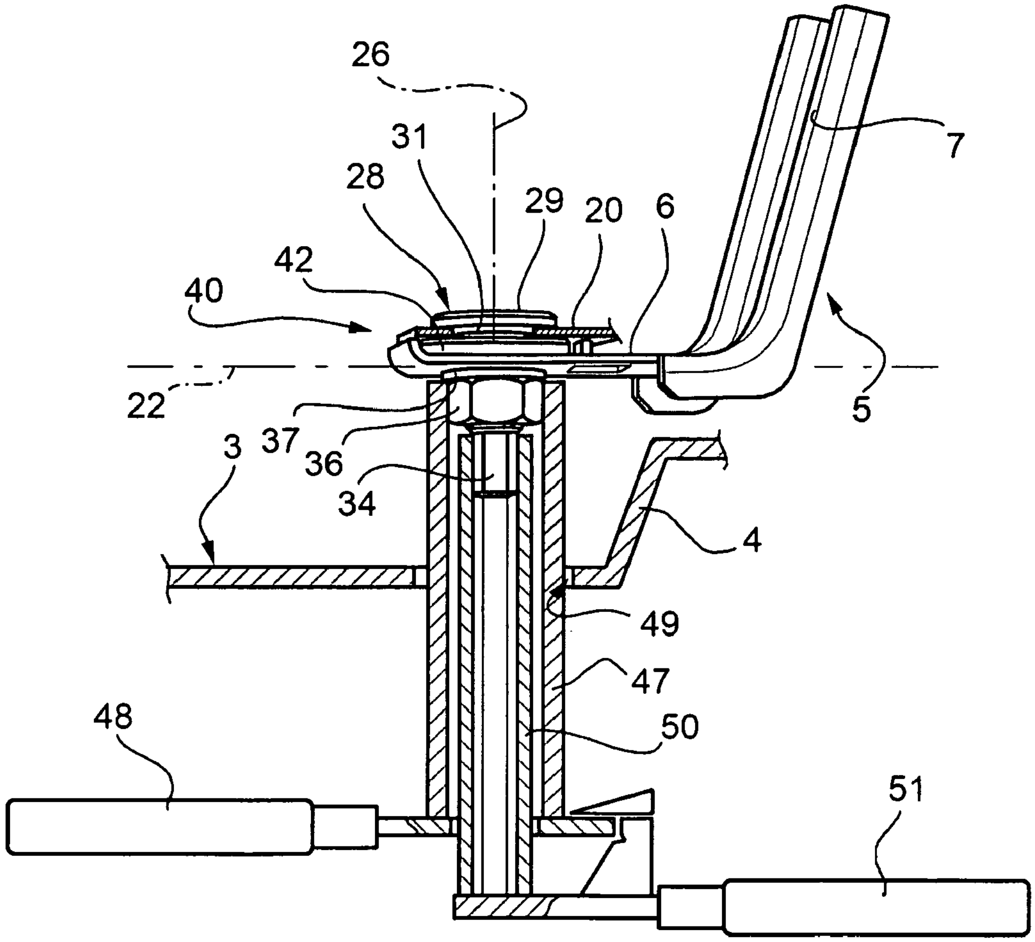
FIG. 4 is a side view of the detail in FIGS. 2 and 3 during an adjustment, with parts shown in cross-section.

With reference to FIG. 4, the assembly 1 is housed in a cavity 3 defined by a lower box portion 4 of the door (partially shown). The assembly 1 comprises a fixed support structure, of which only a bracket 5 is shown in the attached figures. The bracket 5 is L-shaped, is arranged at the lower end of the cavity 3, is fixed to the portion 4 in a way that is not shown, for example through use of screws, and comprises a lower horizontal plate 6 and an upper substantially vertical plate 7 that are connected to each other.

With reference to FIG. 1, the assembly 1 also comprises a frame defined by two elements 8,9, which are horizontally spaced from each other and carry a window-winding device 10 of a type that is known and is not described in detail. The description that follows will only refer to the element 8, since the element 9 has substantially the same characteristics.

The element 8 is defined by a plate, which is elongated in a vertical direction and is arched in such a way as to have a concave rear surface and a convex frontal surface 12. The surface 12 faces a lateral portion 13 of the glass 2 and carries, in a relative fixed position, a guide 14, which extends along a curved direction 15 parallel to the glass 2 and is slidingly engaged by a slide or runner 16. The runner 16 is fixed to the portion 13 in a way that is known and not described in detail, and is pulled along the guide 14 by the device 10 to slide between a raised position, in which the glass 2 closes the window of the door, and a lowered position (not shown), in which the glass 2 is housed in the cavity 3.

The element 8 comprises an upper portion 18 linked to the portion 4 or to the fixed support structure through a coupling device (of a type that is known and is not shown), which is arranged on the rear surface of the element 8 and defines a hinge or a ball joint to make the element 8, the glass 2 and the device 10 tiltable about a substantially horizontal axis of adjustment 19 that is parallel to the glass 2 and orthogonal to the direction 15.

Figure 2:
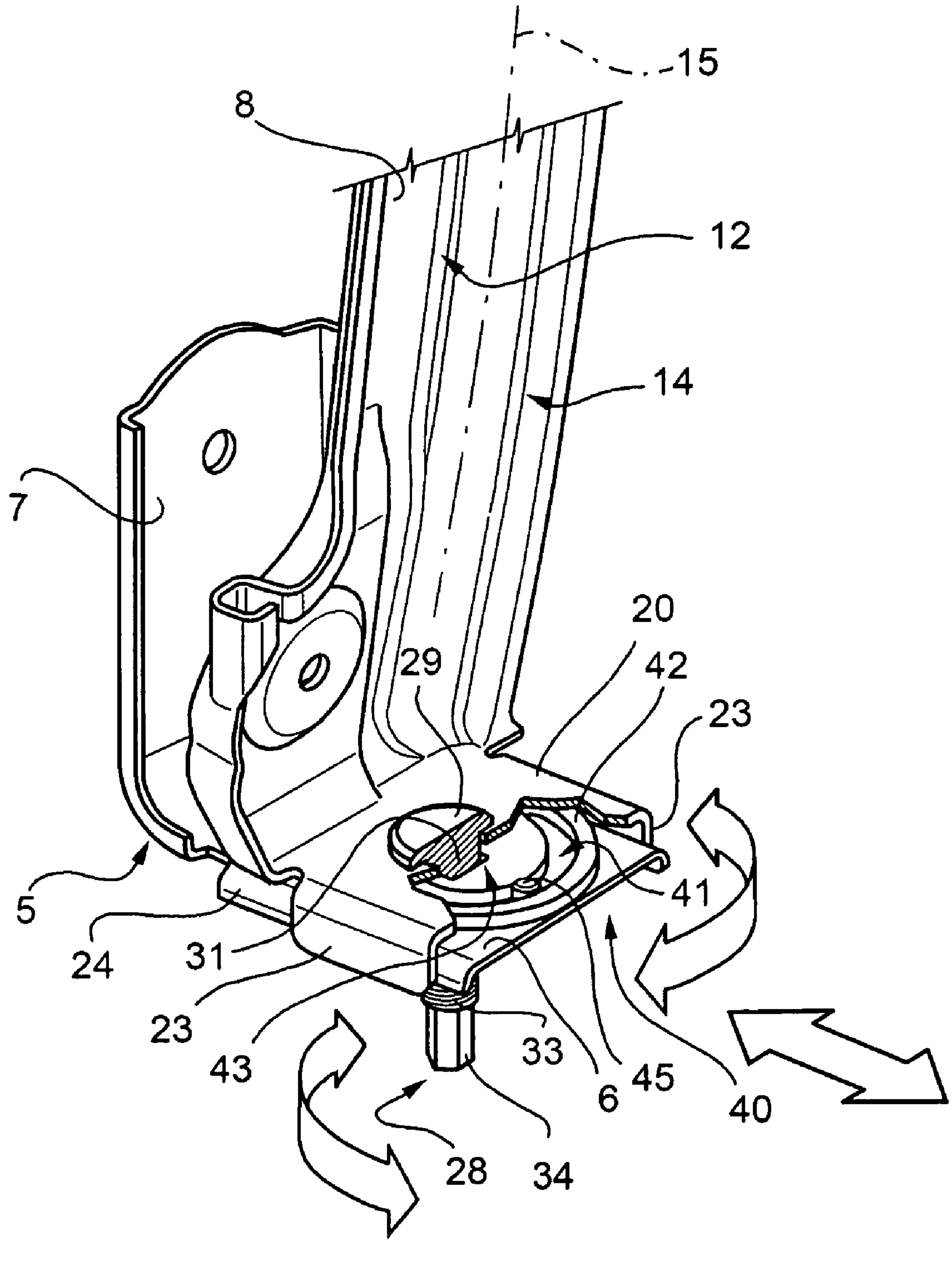
FIG. 2 shows, in perspective, on an enlarged scale and with parts shown in a cross-sectional view, a detail of the assembly in FIG. 1.
Figure 3:
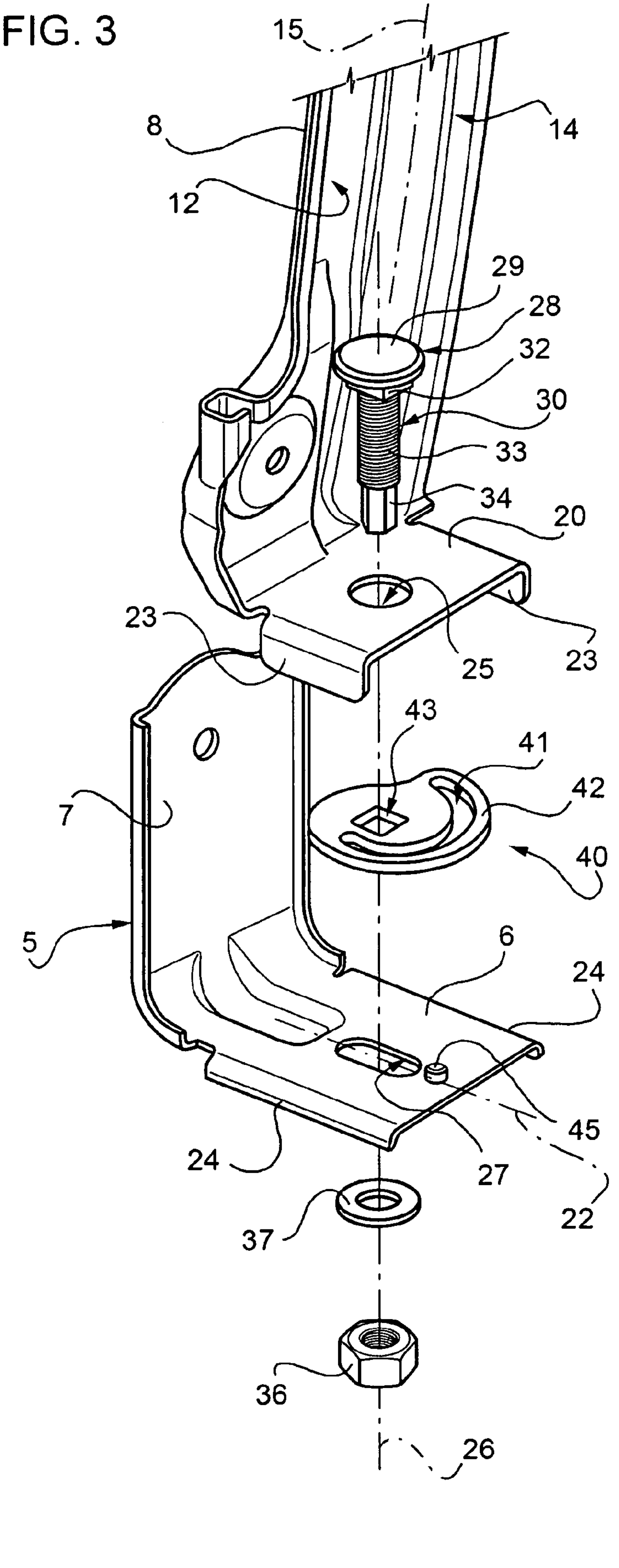
FIG. 3 is similar to FIG. 2 and shows an exploded view of the detail in FIG. 2.

According to that shown in FIGS. 2 and 3, the lower end of the element 8 is defined by a plate 20, which extends in a substantially horizontal direction towards the front in a cantilevered fashion, is superimposed on the plate 6, and is coupled with plate 6 in such a way as to be guided along a direction 22. The direction 22 is tangential with respect to the axis 19 and is parallel to the lateral edges 23 and 24 of the plates 20 and, respectively, 6. In particular, the edges 23 of the plate 20 are defined by respective tabs, which are folded downwards with respect to the plate 20, are arranged on opposing lateral sides of the plate and are slidingly coupled to the edges 24, which therefore guide the movement of the element 8.

The plates 20 and 6 have, respectively, a round through-hole 25, with an axis 26 orthogonal to the direction 22, and a slot 27 elongated along the direction 22. The hole 25 and the slot 27 are aligned along the axis 26 and are engaged by a pin 28, which comprises an upper head 29 resting on the upper face of the plate 20 and a lower axial rod 30. The rod 30 comprises, in succession, a cylindrical upper end portion 31 (FIG. 2), an intermediate portion 32 with a quadrangular cross-section (FIG. 3), an intermediate threaded portion 33, and a lower end portion 34 with a hexagonal cross-section. The portion 31 is coupled to the internal edge of the hole 25, so that the pin 28 is axially rotatable, but arranged in a horizontal fixed position on the plate 20.

With reference to FIG. 3, the portion 33 has an outside diameter greater than that of the portion 34, extends with a clearance in the slot 27 and is therefore slidable along the direction 22, protrudes inferiorly with respect to the plate 6, and carries a screwed nut 36. A washer 37 is interposed between the nut 36 and the lower face of the plate 6. The nut 36 may be tightened to lock the pin 28 with respect to the plate 6 and, therefore, lock the position of the element 8 and the glass 2 about the axis 19.

The assembly 1 comprises a positioning device 40 that converts the motion from rotational to translational to position the pin 28 along the slot 27 in response to a rotation of the pin 28 about the axis 26.

The device 40 comprises a cam 41 defined by a spiral groove obtained for an angle of 180° about the axis 26 on a plate 42. The plate 42 rests on a plane orthogonal to the axis 26, is a piece that is separate in relation to the pin 28 and is arranged between the plates 20 and 6, and has a through-hole 43 that complements the portion 32 and is engaged by the portion 32, so that the cam 41 is fixed with respect to the pin 28. The device 40 also comprises a tappet 45 defined by a peg which is fixed to the plate 6, is arranged along the direction 22, and protrudes parallel to the axis 26 from the upper face of the plate 6 for a maximum height equal to the thickness of the plate 42, in such a way as to slidingly engage the cam 41.

With reference to FIG. 4, to adjust the position of the frame 6 and of the glass 2 about the axis 19, the nut 36 is loosened using a tubular hex key 47, which can be operated manually from outside the door using a lever 48 and is made to pass along the axis 26 in an opening 49 made in a lower side of the portion 4.

After loosening the nut 36, the pin 28 can slide along the slot 27, even if it remains coupled to the plate 6 through the device 40. To position the pin 28 along the direction 22, the portion 34 is rotated axially using a tubular adjustment key 50, which can be operated manually from outside the door using a lever 51 and is made to pass coaxially and inside the key 47.

During the rotation of the pin 28, the cam 41 is made to rotate. The cam 41 defines a path with variable distance from the axis 26, so that the peg 45 is brought further away from or nearer to the axis 26. The relative movement between the axis 26 and the peg 45 causes the pin 28 to translate along the direction 22.

Once the glass 2 has been placed in the correct position, the key 47 is turned to tighten the nut 36 maintaining the key 50 in a fixed position. The tightening of the nut 36 locks the plate 21 between the plates 20 and 6, so that the translation of the pin 28 is also blocked.

From the operation described above, it is clear that the adjustment of the glass 2 about the axis 19 is simple and precise, since it is carried out by turning the pin 28 around its axis 26, without the need to act directly on the glass 2 or on the elements 8,9 of the frame, and without having to push or pull the pin 28 along the direction 22. The cam 41 has an angle of rotation proportional to the translation of the pin 28 and, by defining an arched path with a length greater than that of the slot 27, it expands the adjusting stroke in relation to the slot 27, so that positioning is carried out in a more precise manner than that of the prior art devoid of the device 40.

Furthermore, the position chosen for the glass 2 following the adjustment is not changed by the operations to tighten the nut 36, since the pin 28 can be easily maintained in a fixed position along the slot 27 during such operations.

Finally, it is also clear that modifications and variations can be made to the assembly 1 described and shown here without leaving the protective scope of this invention, as defined in the attached claims.

The cam 41 could extend about the axis 26 by an angle other than of 180°; and/or the slot 27 and the peg 45 could be carried by the element 8 with the pin 28 carried by the bracket 5, in a dual manner with respect to the preferred solution described above; and/or the pin 28 could be parallel to the axis 19 (instead of being radial to the axis 19), with the plates 6 and 20 vertical (instead of horizontal).

Furthermore, to couple the cam 41 and the pin 28 in a fixed angular way, the portion 32 and the hole 43 could have only one flat side; or the plate 42 and the pin 28 could be fixed to each other, with the cam 41 possibly arranged externally with respect to the plates 20 and 6, instead of being locked between the plates 20 and 6.

Finally, the assembly 1 could also be used for a rear window with an unframed upper edge, instead of for the glass of a side door.

What we claim is:

1. Glass supporting assembly for a motor vehicle door with an unframed upper edge; the assembly comprising:

a fixed structure;

a frame comprising:

a) at least one guide to support a glass and make the glass slide between a raised position and a lowered position, and b) an upper portion connectable to said door in such a way as to make said frame tiltable in relation to said fixed structure about a substantially horizontal axis of adjustment;

a slot obtained in one of either said fixed structure or said frame and elongated in a tangential direction with respect to the axis of adjustment;

a pin carried by the other of either said fixed structure or said frame, with an axis orthogonal to said tangential direction and slidable in said slot; and locking means to lock said frame in relation to said fixed structure;

wherein said pin is rotatable about its own axis in relation to said fixed structure and said frame, and wherein said pin comprises a positioning device that converts the motion from rotational to translational to position said pin along said slot in response to a rotation of said pin about the axis of said pin; and wherein said positioning device comprises:

a cam fixed in relation to said pin, resting on a plane orthogonal to the axis of said pin, and defining a path with variable distance from the axis of said pin, and a tappet engaging said cam and carried by the same component in which said slot is obtained.

2. Assembly according to claim 1, wherein said cam is interposed between said frame and said fixed structure and is defined by a piece that is separate in relation to said pin and with a through-hole engaged in an angularly fixed way by an intermediate portion of said pin.

3. Assembly according to claim 1, wherein said slot and said tappet are carried by said fixed structure.

4. Assembly according to claim 1, wherein said tappet is arranged in a position aligned with said slot along said tangential direction.

5. Assembly according to claim 1, wherein said tappet is defined by a peg parallel to said pin, and that said cam is defined by a spiral groove obtained in a plate.

6. Assembly according to claim 1, wherein said pin and said slot are carried by respective plates, which are substantially parallel, define the lower ends of said frame and, respectively, of said fixed structure and are both guided along said tangential direction.

7. Assembly according to claim 6, wherein the lateral ends of one of said plates are defined by respective tabs slidingly coupled to the lateral edges of the other of the said plates.

8. Assembly according to claim 1, wherein said cam extends about the axis of said pin for an angle at least equal to 180°.

9. Assembly according to claim 1, wherein said pin comprises a head resting on a portion of said frame and an end portion opposite to said head, protruding in relation to said fixed structure and having a hexagonal cross-section.

10. Assembly according to claim 9, wherein said pin comprises an intermediate threaded portion adjacent to said end portion, protruding in relation to said fixed structure, and with a diameter greater than that of said end portion; and by the fact that said locking means comprise a nut screwed to said intermediate threaded portion.

* * * * *